United States Patent [19]

Kawai

[11] Patent Number: 4,565,391
[45] Date of Patent: Jan. 21, 1986

[54] DRIVING FORCE TRANSMITTING MEMBER FOR PASSIVE SEAT BELT

[75] Inventor: Osamu Kawai, Kanagawa, Japan
[73] Assignee: NSK-Warner K.K., Japan
[21] Appl. No.: 588,395
[22] Filed: Mar. 12, 1984
[30] Foreign Application Priority Data Mar. 17, 1983 [JP] Japan .................................. 38837[U]

[51] Int. Cl.⁴ ............................................ B60R 21/10
[52] U.S. Cl. ................................................... 280/804
[58] Field of Search ............... 280/804, 803, 802, 807, 280/808

[56] References Cited

U.S. PATENT DOCUMENTS

| | | | |
|---|---|---|---|
| 3,842,929 | 10/1974 | Wada et al. | 280/804 |
| 4,274,658 | 6/1981 | Takata | 280/804 |
| 4,302,031 | 11/1981 | Nishimura et al. | 280/804 |
| 4,313,622 | 2/1982 | Suzuki et al. | 280/804 |
| 4,365,827 | 12/1982 | Takada | 280/804 |
| 4,498,690 | 2/1985 | Takada | 280/804 |
| 4,505,496 | 3/1985 | Fohl | 280/804 |

FOREIGN PATENT DOCUMENTS

| | | |
|---|---|---|
| 148632 | 11/1980 | Japan . |
| 47333 | 4/1981 | Japan . |
| 31255 | 2/1982 | Japan . |
| 31256 | 2/1982 | Japan . |

Primary Examiner—Richard A. Bertsch
Attorney, Agent, or Firm—Cantor and Lessler

[57] ABSTRACT

A tape-like driving force transmitting member is used in a passive seat belt to guide a webbing automatically between a passenger-restraining position and a passenger-releasing position. A plurality of notches is spacedly formed in at least one side edge of the driving force transmitting member. Owing to the provision of the notches, the driving force transmitting member of this invention can be bent readily not only in its thickness direction but also in its width direction, thereby allowing the driving force transmitting member to move smoothly.

16 Claims, 13 Drawing Figures

DRIVING FORCE TRANSMITTING MEMBER FOR PASSIVE SEAT BELT

BACKGROUND OF THE INVENTION (1) Field of the Art:

This invention relates to a driving force transmitting member suitable for use in a passive seat belt, and more specifically to a driving force transmitting member which features readiness in bending not only thicknesswise but also widthwise and is hence suitable particularly for use in a passive seat belt.

(2) Description of the Prior Art:

In a passive seat belt, a driving force transmitting member is incorporated to move, along a slide rail, a runner on which one end of a webbing is fixedly secured or a guide ring which serves to guide a non-extreme portion of a webbing. There has conventionally been employed, as such a driving force transmitting member, a geared wire formed of a spirally-wound wire, a thick tape formed of a thick synthetic resin tape through which small holes have been formed at equal intervals, or the like. A portion of such a geared wire or thick tape is fixedly coupled with the aforementioned runner or guide ring and the geared wire or thick tape is brought into meshing engagement with a drive gear of a motor. Thus, the runner or guide ring, namely, the webbing can be moved by way of the geared wire or thick tape upon rotation of the motor.

Among passive seat belts making use of such prior art force transmitting members, those relying upon thick tapes have already found some commercial utility owing to their advantages, namely, light weights and less occurrence of noise When using such thick tapes as driving force transmitting members, they encounter such a problem that they cannot be readily bent widthwise although they can be bent with ease in their thickness directions.

It is however general that a slide rail, which is provided along a vehicle body, is bent not only in the vertical direction (see, FIG. 1 which will be described later) but also in the width direction of the vehicle (in other words, cambered laterally). In addition, a guide member which guides a thick tape from the slide rail to a motor is generally bent in the width direction of the vehicle Where the thick tape cannot undergo ready bending in its width direction, significant sliding resistance is developed between the thick tape and its corresponding slide rail or guide member, leading to a potential danger that its corresponding runner or guide ring may not be allowed to undergo smooth movement.

SUMMARY OF THE INVENTION

With the foregoing in view, the present invention has as its object the provision of a tape-like driving force transmitting member which has been rendered bendable readily in the width direction too so that it may be allowed to move smoothly through a slide rail or tape-guiding member.

In one aspect of this invention, there is thus provided a tape-like driving force transmitting member suitable for use in a passive seat belt equipped with a rail mounted on a vehicle, a runner connected to one end of the driving force transmitting member and received in the rail so as to guide a webbing automatically between a passenger-restraining position and a passenger-releasing position, and drive means adapted to drive the driving force transmitting member in the lengthwise direction thereof, the improvement which comprises that a plurality of notches is spacedly formed in at least one side edge of the driving force transmitting member.

Owing to the provision of the notches, the driving force transmitting member of this invention can be bent readily not only in its thickness direction but also in its width direction. Therefore, it can move smoothly through the slide rail or guide member which is bent also in the width direction of the vehicle. Accordingly, the present invention has brought about such an advantageous effect that a passive seat belt permitting smooth guide for its webbing can be provided.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

Some preferred embodiments of this invention will hereinafter be described with reference to the accompanying drawings.

Figure 1:
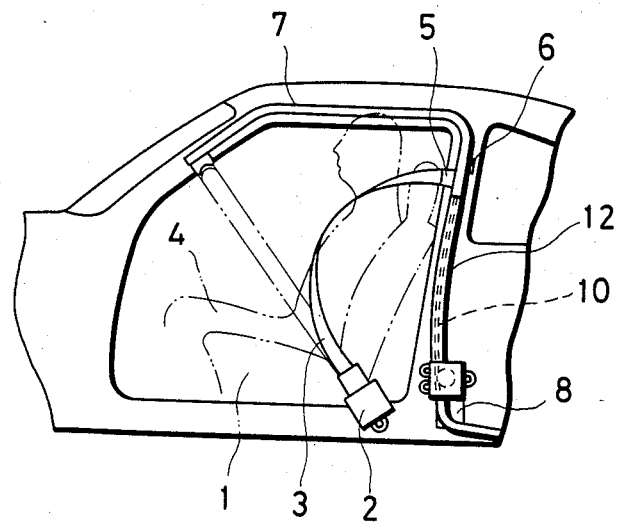
FIG. 1 is a schematic illustration of one example of the passive seat belt to which the present invention may be applied.
Figure 2A:
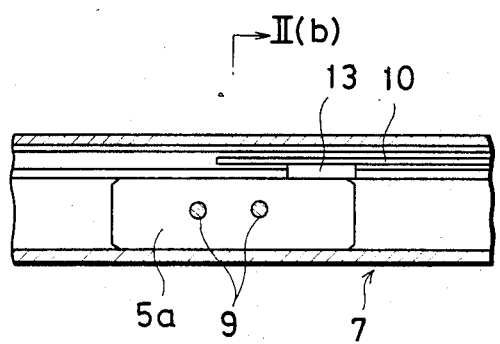
FIG. 2 is a fragmentary cross-sectional view of the passive seat belt shown in FIG. 1.
Figure 2B:
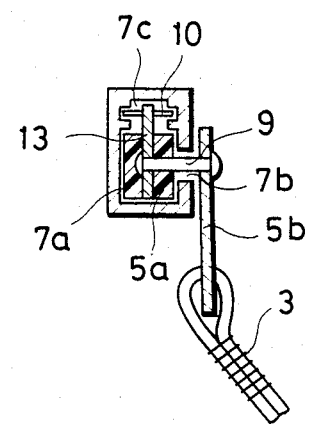
Figure 3:
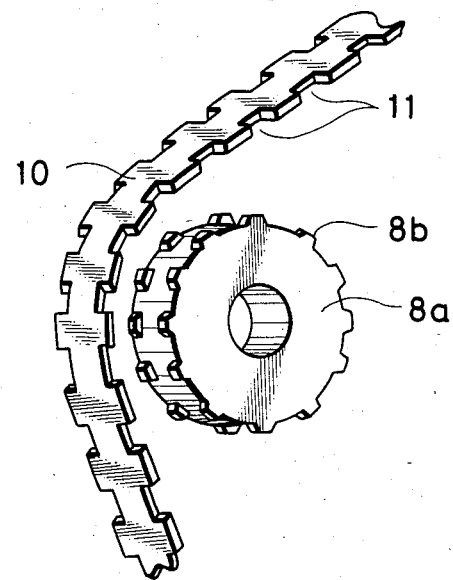
FIG. 3 is a perspective view of a driving force transmitting member according to the first embodiment of this invention and a gear which undergoes meshing engagement with the driving force transmitting member.

Referring first of all to FIG. 1, a known retractor 2 is fixedly secured in the rear bottom corner on the inner side wall of a seat 1. Its webbing 3 extends upwardly, crossing diagonally in front of an occupant 4. A runner 5, which is attached to the upper end portion of the webbing 3, is slidably held in a slide rail 7 provided along the roof of the passenger car and in the front-to-rear direction of the passenger car. The slide rail 7 is bent at both end portions thereof and has a square U-like lateral cross-sectional shape. Namely, as depicted in FIGS. 2(a) and 2(b), a sliding portion 5a of the runner 5 is slidably received in a guide cavity 7a formed in a middle-to-lower part of the slide rail 7. The webbing 3 is connected to the sliding portion 5a by way of a plate 5b and pins 9 which extend through a slot 7b. At a lower end part of a rear bent portion of the slide rail 7, there is provided a latch device 6 which engages with the runner 5 so as to prevent its further movement. The runner 5 is moved by means of a force transmitting member 10 which is driven by a reversible motor 8 (see, FIG. 1). The reversible motor 8 makes up a part of a drive means and is provided in the vicinity of the seat 1. The force transmitting member 10 is formed into a tape-like shape with a flexible synthetic resin (for example, a polyester) as depicted in FIG. 3, and defines a plurality of notches 11 in both sides thereof. As readily seen from FIG. 3, the force transmitting member 10 may be considered to be symmetrical relative to the longitudinal central axis thereof.

The force transmitting member 10 is guided at a non-extreme portion thereof by means of a hollow guide member 12 provided along a predetermined path (see, FIG. 1). One end of the force transmitting member 10 is movably received in a guide cavity 7c of the slide rail 7 as illustrated in FIG. 2(b), whereas the other end portion of the force transmitting member 10 is connected to the motor 8 by way of a gear 8 mounted on the motor shaft (not shown). Namely, as illustrated in FIGS. 1 and 3, the force transmitting member 10 is kept at its notches in meshing engagement with teeth 8b of the gear 8a which constitutes drive means fixedly provided on the motor shaft (not shown).

When the occupant 4 opens the door (not illustrated) in order to get in or out of the passenger car, the motor 8 rotates in a prescribed direction and moves the force-transmitting member 10 forwards (i.e., leftwards as seen in FIG. 1) in its entirety owing to successive meshing engagement between the gear 8a and the notches. At the same time, the runner 5 is also moved in the same direction along the rail 7. Upon completion of the forward movement of the runner 5, the webbing 3 assumes the position indicated by two-dot chain lines in FIG. 1 and permits the occupant to get in or out of the passenger car.

Since the notches 11 are formed in the side edges 11 of the force transmitting member 10 so that the force transmitting member 10 has been rendered bendable readily in the width direction thereof, the force transmitting member 10 can follow the slide rail 7 without problems and can thus move smoothly through the slide rail 7 even if the slide rail 7 is bent in the width direction of the passenger car. In addition, the runner 5 coupled with the force transmitting member 10 by means of a connecting member 13 is received in the guide cavity 7a without any substantial clearance therebetween. Accordingly, the runner 5 is allowed to move smoothly without developing any substantial unsoundness. Incidentally, the runner 5 is formed of the sliding portion 5a, plate 5b, pins 9 and connecting member 13.

When the occupant 4 sits in the seat 1 and closes the door, the motor 8 rotates in a direction opposition to that mentioned above to cause the force transmitting member 10 to move rearwardly and then downwardly along the center pillar, thereby allowing the webbing 3 to restrain the occupant 4 over his lap area and right shoulder.

Figure 4:
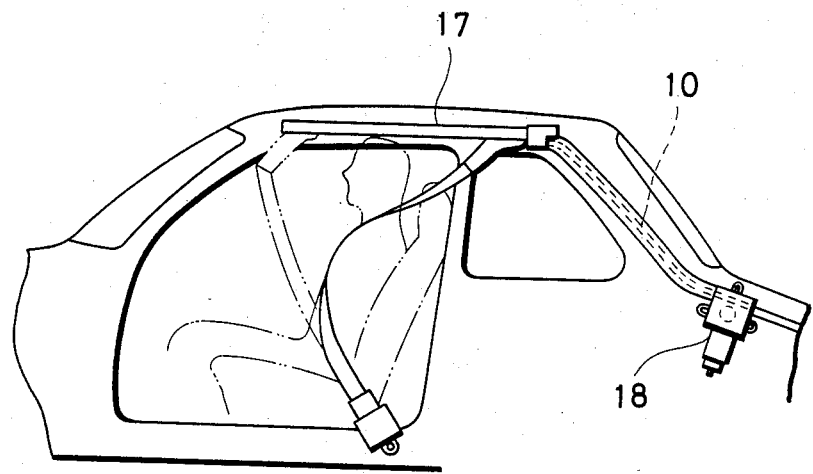
FIG. 4 is a schematic illustration of another example of the passive seat belt to which the present invention may be applied.

Incidentally, a slide rail 17 may be provided, as shown in FIG. 4, along the roof side of the passenger car and a motor may be arranged, as also seen in the same figure, at a location remote from the seat. The force transmitting member 10 may then be provided between the slide rail 17 and the motor 18.

Whichever system is employed, one end of a webbing may be provided with a runner via a buckle which is releasable in the event of an emergency.

Although omitted in the drawings for the sake of simplification, a guide ring may be provided to guide a non-extreme portion of the webbing and the guide ring may then be moved by the motor by way of the driving force transmitting member.

Figure 5:
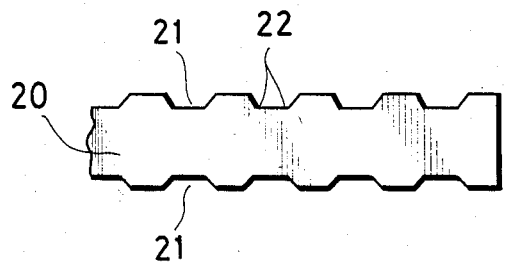
FIG. 5 is a fragmentary plan view of a driving force transmitting member according to the second embodiment of this invention.
Figure 6:
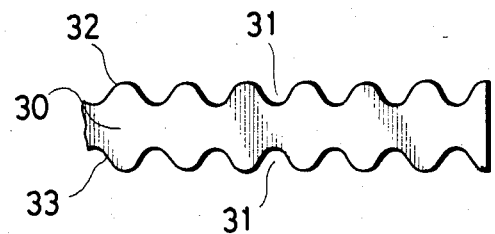
FIG. 6 is a fragmentary plan view of a driving force transmitting member according to the third embodiment of this invention.

Further embodiments of this invention in which the shape of the driving force transmitting member has been changed in various ways will next be described. In the second embodiment shown in FIG. 5, trapezoidal notches 21 are formed in a driving force transmitting member 20. In the third embodiment depicted in FIG. 6, arcuate or semi-circular notches 31 are formed in a driving force transmitting member 30, whereby forming both longitudinal edges 32,33 of the driving force transmitting member 30 into wavy forms. Accordingly, obtuse corners 22 are formed in the former embodiment while no corners are formed in the latter embodiment. Thus, the driving force transmitting member of the latter embodiment can exhibit stronger resistance to the occurrence of cracks or the like.

Figure 7:
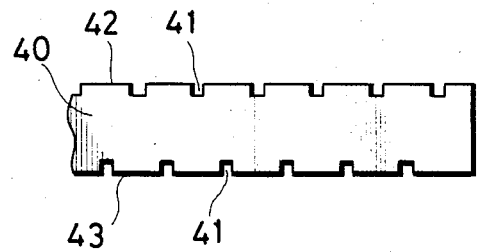
FIG. 7 is a fragmentary plan view of a driving force transmitting member according to the fourth embodiment of this invention.

In the fourth embodiment illustrated in FIG. 7, notches 41 formed in one side edge 42 of a driving force transmitting member 40 are offset in positions from their corresponding notches 41 formed in the other side edge 43 of the same driving force transmitting member 40. Thus, the driving force transmitting member 40 is asymmetrical relative to its longitudinal central axis. Hence, the widthwise cross-sectional area, in other words, the lateral cross-sectional area of the driving force transmitting member 40 undergoes a smaller change along its length, compared with that of the driving force transmitting member according to each of the above mebodiments.

Figure 8:
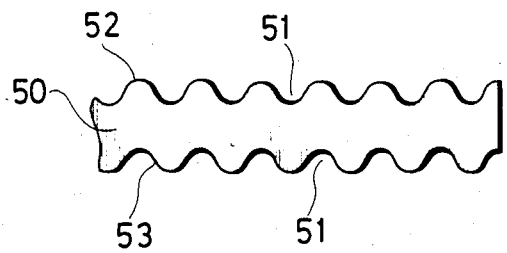
FIG. 8 is a fragmentary plan view of a driving force transmitting member according to the fifth embodiment of this invention.
Figure 9:
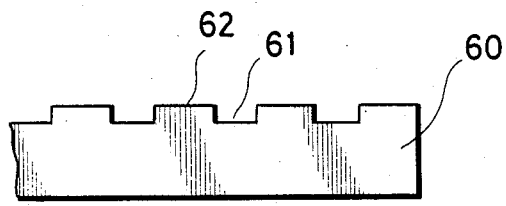
FIG. 9 is a fragmentary plan view of a driving force transmitting member according to the sixth embodiment of this invention.

In the fifth embodiment illustrated in FIG. 8, notches 51 formed in one side edge 52 of a driving force transmitting member 50 are offset in positions from their corresponding notches 51 formed in the other side edge 53. Therefore, the distance between the side edge 52 and the side edge 53 remains constant along the entire length of the driving force transmitting member 50 provided that the distance is measured at right angles relative to the longitudinal central axis of the driving force transmitting member 50.

In the sixth embodiment, notches 61 are formed in only one side edge 62 of a driving force transmitting member 60.

Figure 10:
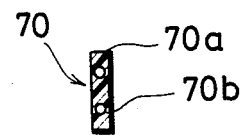
FIG. 10 is a lateral cross-sectional view of a driving force transmitting member according to the seventh embodiment of this invention.

Description will next be made on the seventh embodiment of this invention, which is directed to a driving force transmitting member the constitution of which has been changed from those of the aforementioned embodiments. FIG. 10 illustrates its cross-sectional shape. A force transmitting member 70 is constructed of a main body 70a of a synthetic resin and reinforcing members 70b formed of steel wires, reinforced threads, or the like. The main body 70a is similar to the driving force transmitting member of each of the above-mentioned embodiments. Owing to the adoption of such a structure, the strength has been improved compared with that of a driving force transmitting member made of a synthetic resin only. Such reinforcing members may be incorporated in any of the above-described embodiments.

Figure 11:
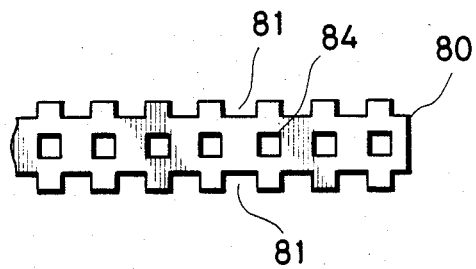
FIG. 11 is a fragmentary plan view of a driving force transmitting member according to the eighth embodiment of this invention.
Figure 12:
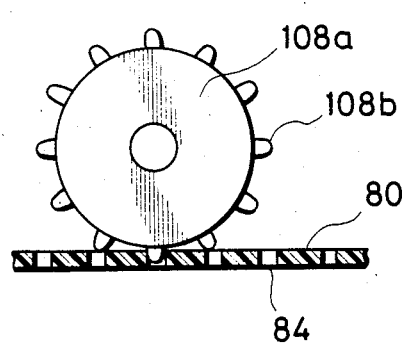
FIG. 12 is a side view illustrating the manner of meshing engagement between the driving force transmitting member according to the eighth embodiment of this invention and a gear.

Next description will be made on the eighth embodiment of this invention, in which the manner of meshing enagement between the driving force transmitting member and the gear has been modified. As illustrated in FIG. 11, a force transmitting member 80 defines notches in both longitudinal edges and openings 84 substantially at lateral central portions of wider portions. On the other hand, a gear 108a mounted on the motor shaft is provided with projections 108b along the central axis thereof relative to the width of the gear. The projections 108b are brought into meshing engagement with the openings 84 of the force transmitting member 80 so as to drive the force transmitting member. By forming a driving force transmitting member in the above manner, it is possible to make the lateral cross-sectional area, in other words, the transverse cross-sectional area of the driving force transmitting member substantially unchanged along the length thereof. By the way, the openings 84 may obviously be formed into other shapes such as circles without raising any problems.

In each of the first to eighth embodiments which have been described above, the notches or openings are formed at equal intervals. However, it is not essentially required to form them at equal intervals.

Furthermore, the notches formed in one of the side edges of a tape-like driving force transmitting member may in some instances be different in shape from the notches formed in the other side edge of the same driving force transmitting member.

The transmission of a driving force from the motor to the driving force transmitting member may not necessarily be limited to such an embodiment as effecting it by way of a single piece of gear. It may be performed by way of a number of speed-changing gears.

In addition, as a manner of connecting the drive means to the force transmitting member, it may be feasible to secure one end of the force transmitting member on a drum provided with the motor shaft. In this case, a runner is provided with the other end of the force transmitting member which is wound in the form of a whirlpool on the drum. The length of the force transmitting member wound up on the drum thus changes as the motor rotates, thereby causing the runner to move.

The driving force transmitting member may be used not only in passive seat belts making use of motors as drive means but also in those relying upon mechanical drive means that utilize door-opening and door-closing forces or the like.

As readily understood from the above-described embodiments of this invention, the term "notches" as used herein should be interpreted in such a way that it embraces a variety of shapes such as rectangular notches, trapezoidal notches, square notches and arcuate notches.

Having now fully described the invention, it will be apparent to one of ordinary skill in the art that many changes and modifications can be made thereto without departing from the spirit or scope of the invention as set forth herein.

What is claimed is:

1. In a tape-like driving force transmitting member suitable for use in a passive seat belt, a runner connected to the driving force transmitting member to guide a webbing automatically between a first position and a second position, and drive means adapted to drive the driving force transmitting member in the lengthwise direction thereof, the improvement which comprises that a plurality of notches is spacedly fomed respectively along both side edges of the driving force transmitting member and the drive means includes a gear defining a plurality of teeth, which is brought into meshing engagement with the notches of the drive force transmitting member, with a predetermined interval in the circumferential direction thereof and another predetermined interval in the axial direction thereof.

2. A tape-like driving force transmitting member as claimed in claim 1, wherein the driving force transmitting member defines a plurality of openings formed with an interval along the length of the driving force transmitting member and the drive means is brought into meshing engagement with the openings so as to drive the driving force transmitting member.

3. A tape-like driving force transmitting member as claimed in claim 1, wherein the driving force transmitting member includes at least one reinforcing member.

4. A tape-like driving force transmitting member as claimed in claim 1, wherein the notches are rectangular notches.

5. A tape-like driving force transmitting member as claimed in claim 1, wherein the notches are trapezoidal notches.

6. A tape-like driving force transmitting member as claimed in claim 1, wherein the notches are square notches.

7. A tape-like driving force transmitting member as claimed in claim 1, wherein the notches are arcuate notches.

8. A tape-like driving force transmitting member as claimed in claim 1, wherein said passive seat belt is equipped with a rail to be mounted on a vehicle and said runner is received in said rail.

9. A tape-like driving force transmitting member as claimed in claim 1, wherein said first and second positions are a passenger-restraining position and a passenger-releasing position, respectively.

10. A tape-like driving force transmitting member as claimed in claim 1, wherein the plurality of notches is paired transversely and the plurality of teeth is also paired transversely.

11. In a tape-like driving force transmitting member suitable for use in a passive seat belt, a runner connected to the driving force transmitting member to guide a webbing automatically between a first position and a second position, and drive means adapted to drive the driving force transmitting member in the lengthwise direction thereof, the improvement which comprises that a plurality of transversely-paired notches is spacedly formed respectively along both side edges of the driving force transmitting member, openings are each formed through the driving force transmitting member at the area surrounded by each adjacent two pairs of the transversely-paired notches, and the drive means includes a gear defining a plurality of teeth, which are brought into meshing engagement with the openings, with a predetermined interval in the circumferential direction thereof.

12. A tape-like driving force transmitting member as claimed in claim 11, wherein said passive seat belt is equipped with a rail to be mounted on a vehicle and said runner is received in said rail.

13. A tape-like driving force transmitting member as claimed in claim 11, wherein said first and second positions are a passenger-restraining position and a passenger-releasing position, respectively.

14. In a tape-like driving force transmitting member suitable for use in a passive seat belt, a runner connected to the driving force transmitting member to guide a webbing automatically between a first position and a second position, and drive means adapted to drive the driving force transmitting member in the lengthwise direction thereof, the improvement which comprises that a plurality of notches is spacedly formed along at least one side edge of the driving force transmitting member and the drive means includes a gear having an axis extending in parallel with the width of the driving force transmitting member and defining a plurality of teeth, which is brought into meshing engagement with the notches, with a predetermined interval in the circumferential direction thereof.

15. A tape-like driving force transmitting member as claimed in claim 14, wherein said passive seat belt is equipped with a rail to be mounted on a vehicle and said runner is received in said rail.

16. A tape-like driving force transmitting member as claimed in claim 14, wherein said first and second positions are a passenger-restraining position and a passenger-releasing position, respectively.

* * * * *